United States Patent [19]
Creed et al.

[11] Patent Number: 5,105,606
[45] Date of Patent: Apr. 21, 1992

[54] MEANS FOR HANDLING PLASTIC CONTAINERS

[75] Inventors: Sherman H. Creed, Fresno; Norman A. Planck, Jr., Madera; Wesley W. Walter; Thomas F. Burks, both of Fresno; Carl E. Lindow, San Jose, all of Calif.; Eduard H. J. Damhuis, Bousval, Belgium

[73] Assignee: FMC Corporation, Chicago, Ill.

[21] Appl. No.: 612,165

[22] Filed: Nov. 9, 1990

[51] Int. Cl.$^5$ .................. B65B 35/38; B65B 57/10
[52] U.S. Cl. .................. 53/499; 53/251; 53/534
[58] Field of Search ............. 53/499, 498, 495, 493, 53/534, 244, 251, 250, 249, 260; 198/429, 432

[56] References Cited

U.S. PATENT DOCUMENTS

| | | | |
|---|---|---|---|
| 2,970,418 | 2/1961 | Mulvany et al. | 53/534 X |
| 3,142,948 | 8/1964 | Arnett | 53/499 X |
| 3,300,945 | 1/1967 | Grossi et al. | 53/251 X |
| 4,442,657 | 4/1984 | Busseniers et al. | 53/534 X |
| 4,494,644 | 1/1985 | Rizzo, Sr. | 53/534 X |
| 4,583,351 | 4/1986 | Fallas | 53/534 X |
| 4,611,458 | 9/1986 | Prakken | 53/251 X |
| 4,856,262 | 8/1989 | Uithoven | 53/499 |
| 5,018,338 | 5/1991 | Jurchuk et al. | 53/251 X |

Primary Examiner—James F. Coan
Attorney, Agent, or Firm—Ronald C. Kamp; R. B. Megley

[57] ABSTRACT

A transfer mechanism for transferring groups of plastic containers from a continuously moving transport conveyor to a tray includes container sensors and a mechanism for providing correct in-fee timing of the containers. The tray is advanced after each group of containers is deposited therein and when the tray is full, it is removed.

34 Claims, 10 Drawing Sheets

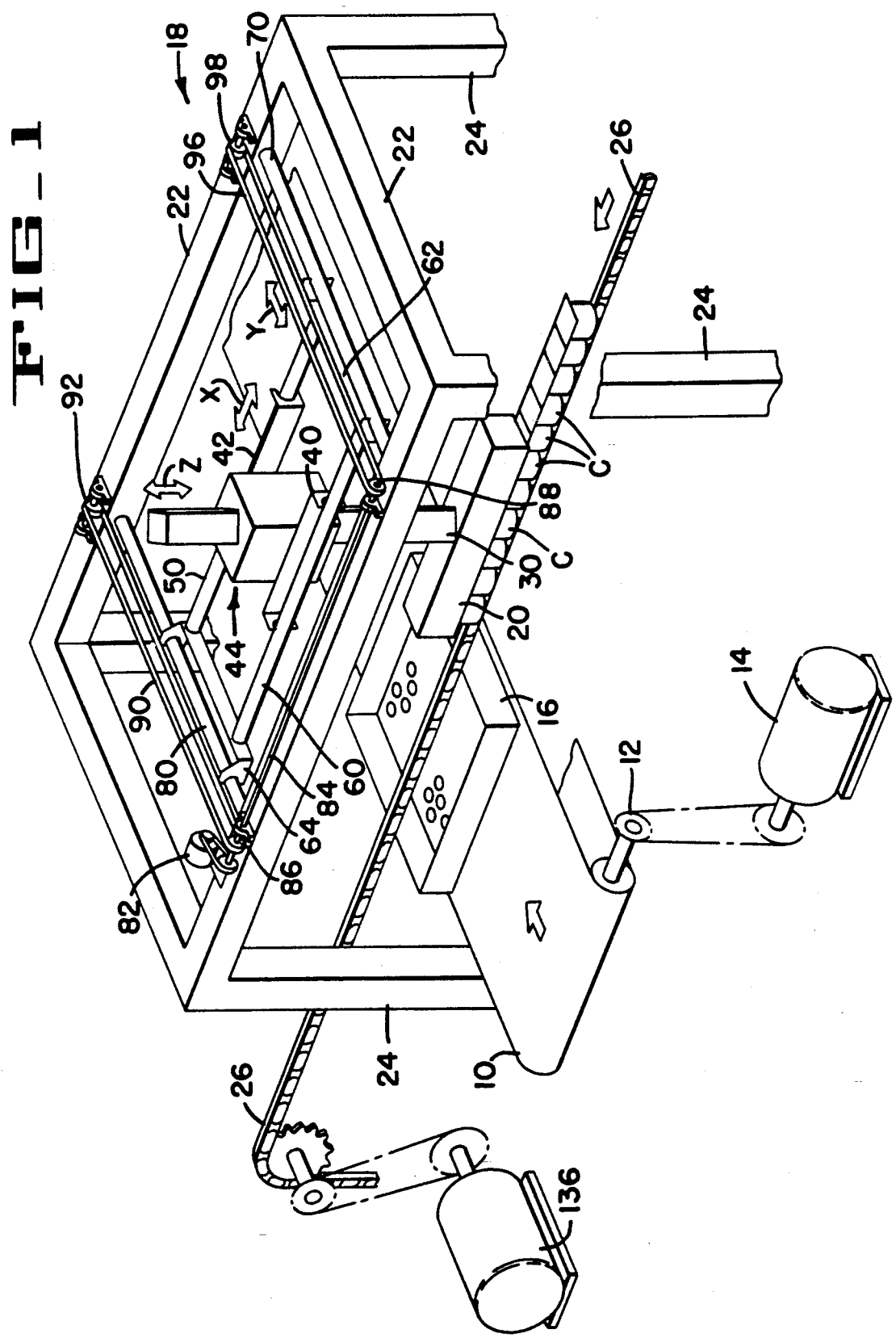
FIG_1

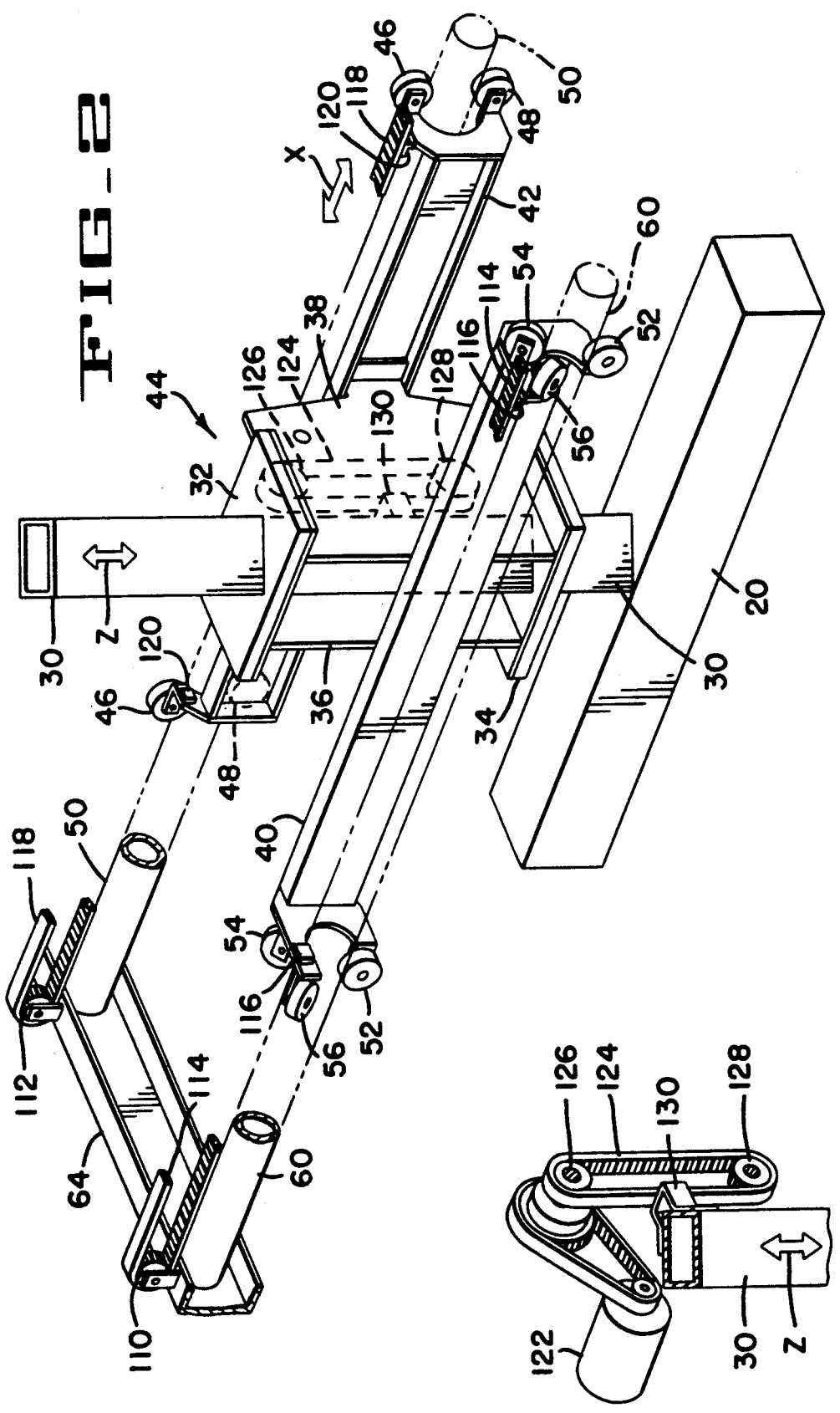

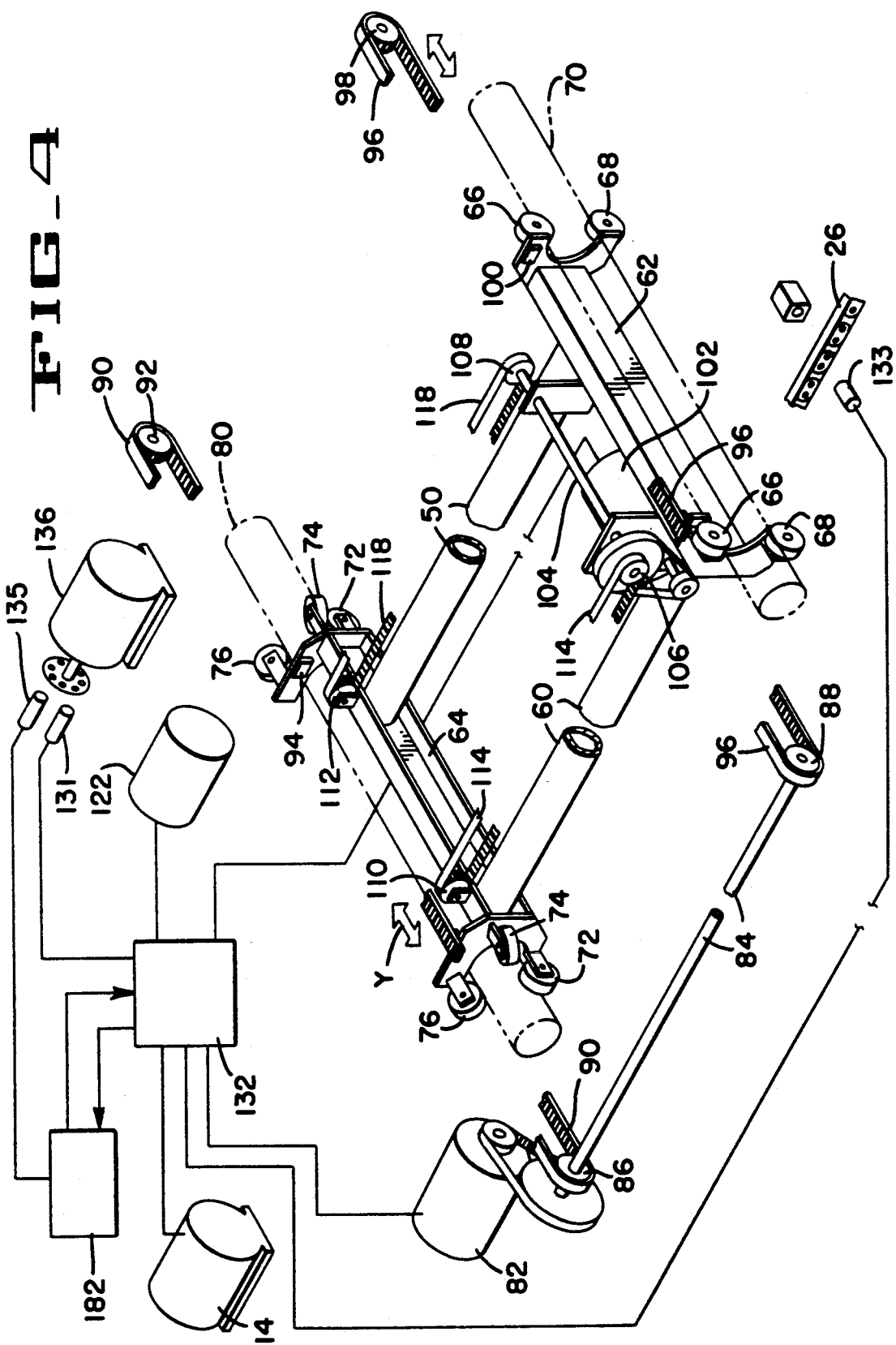

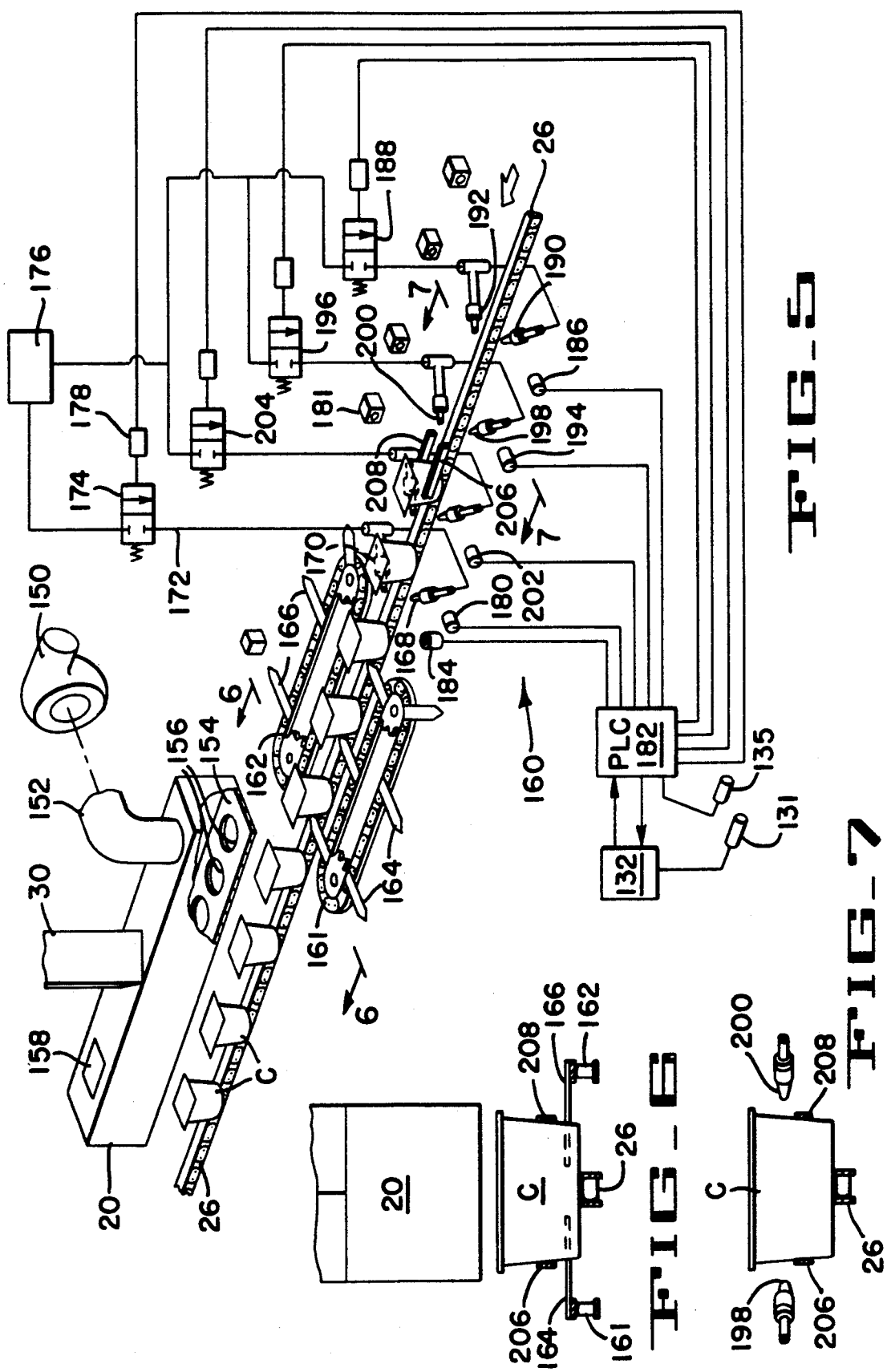

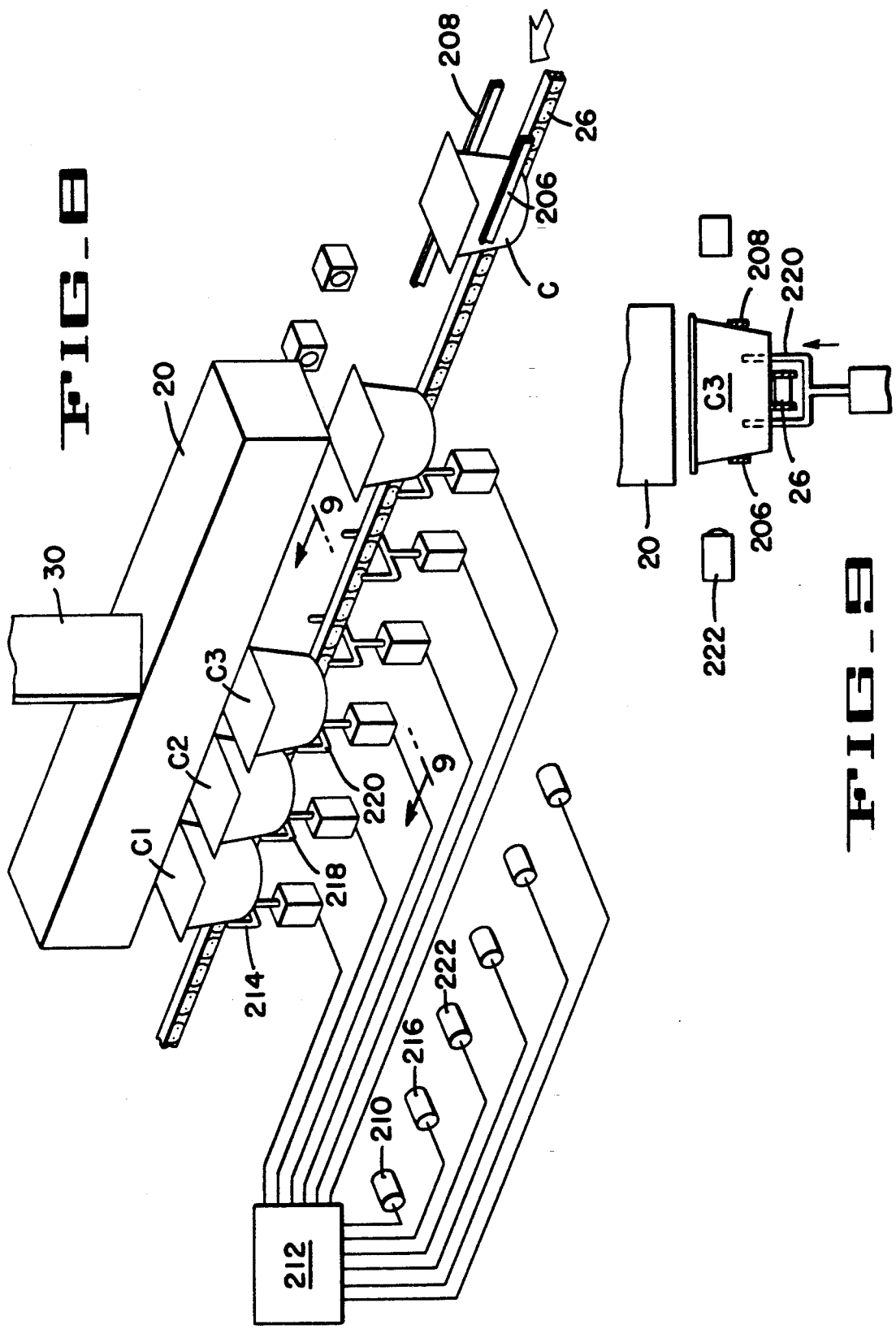

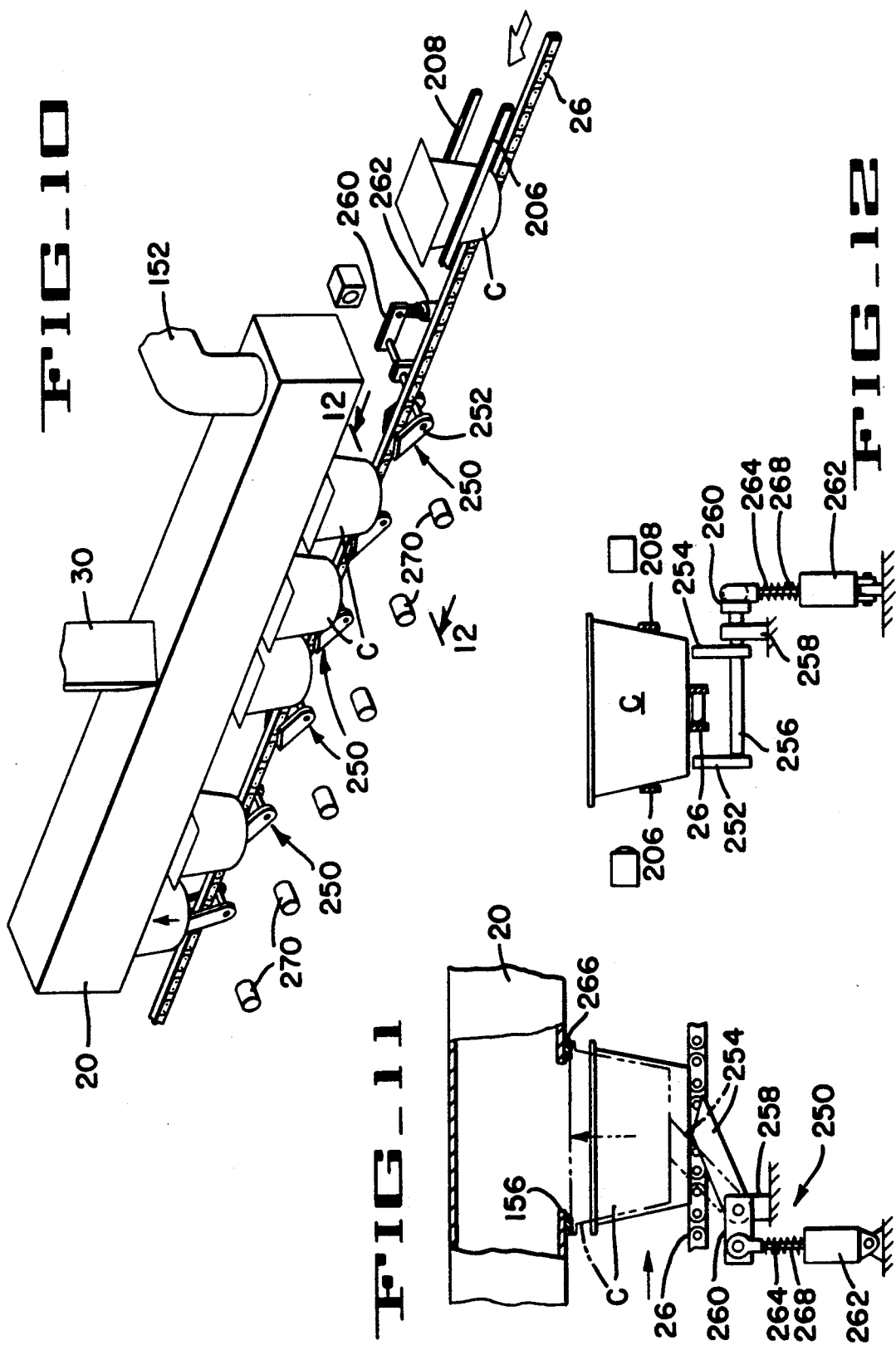

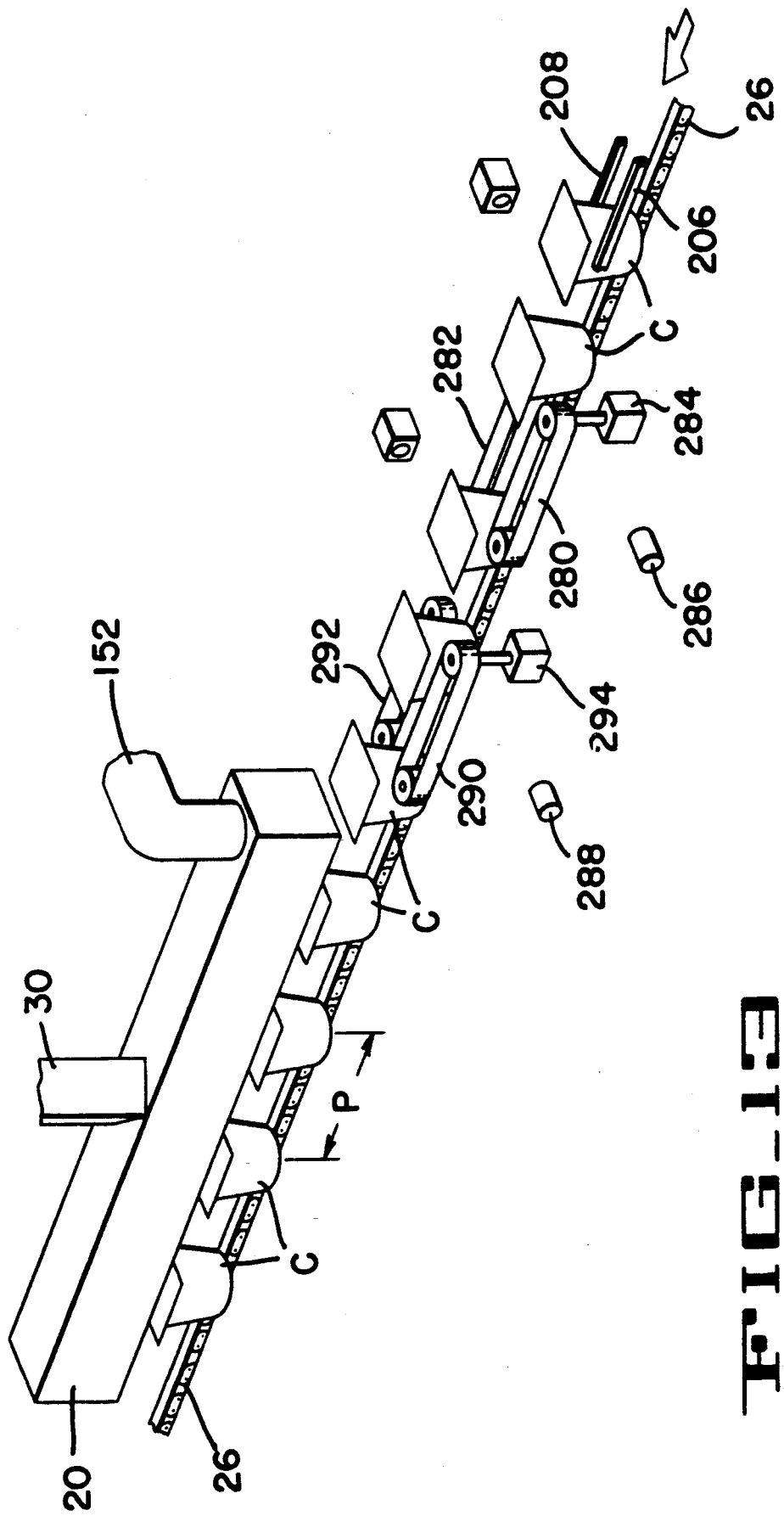
FIG_13

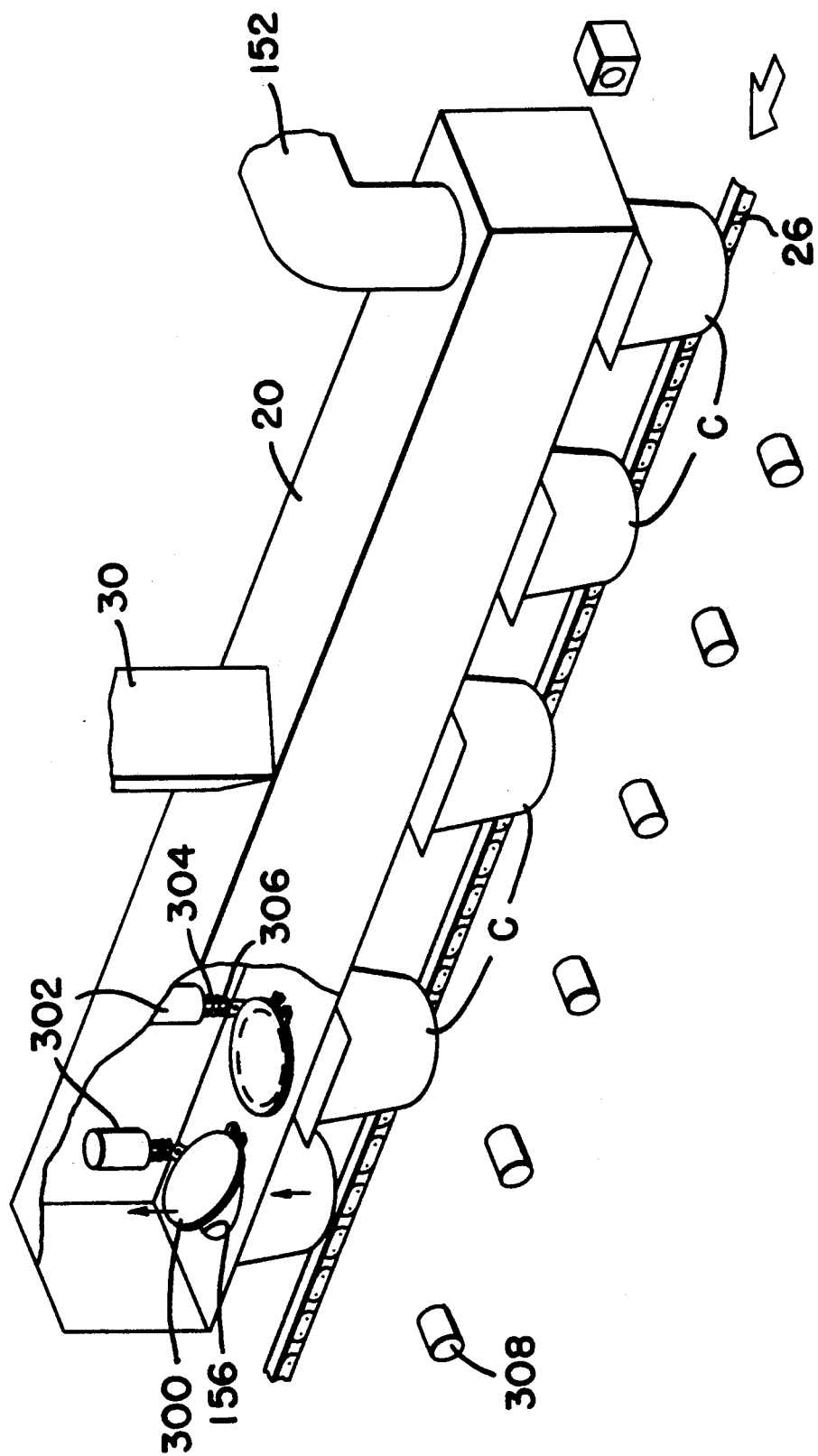

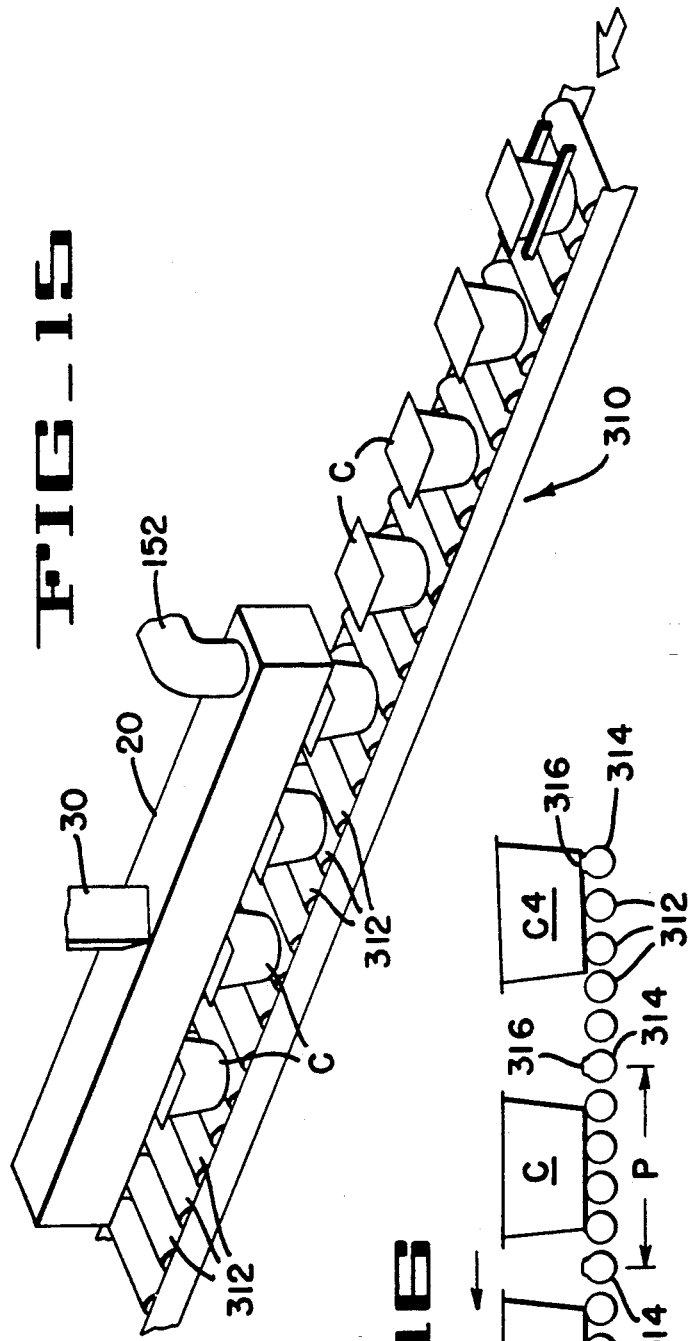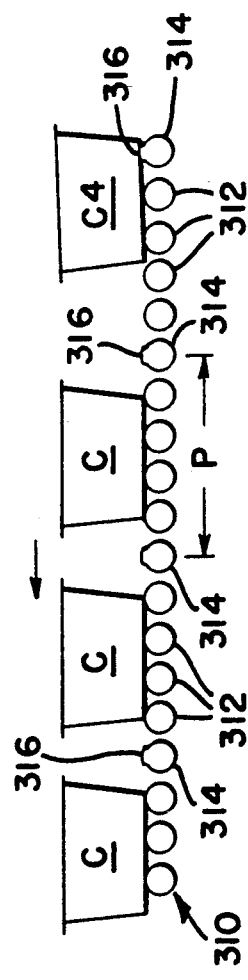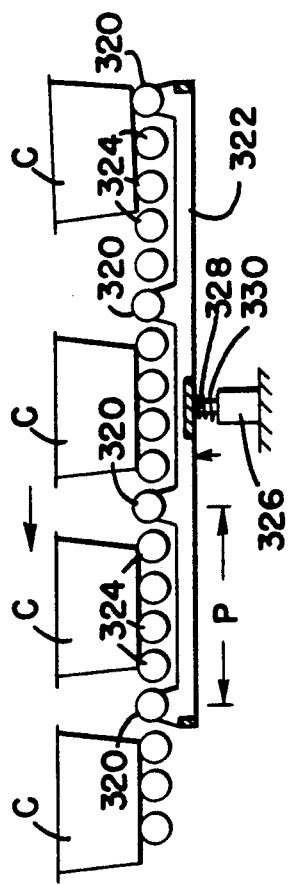

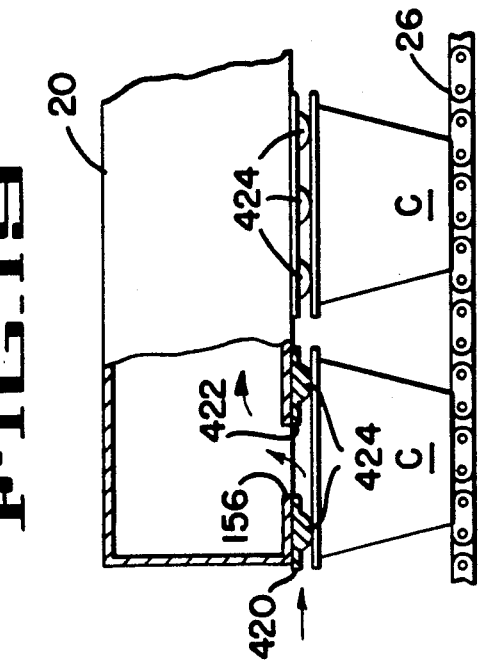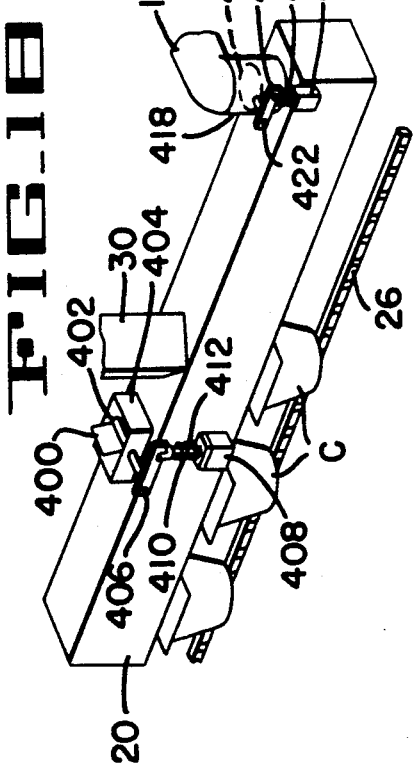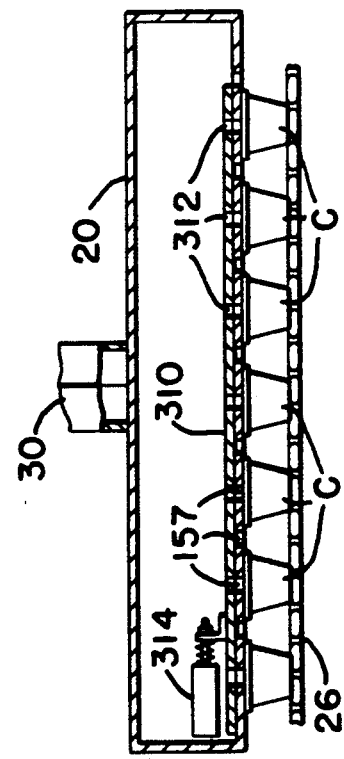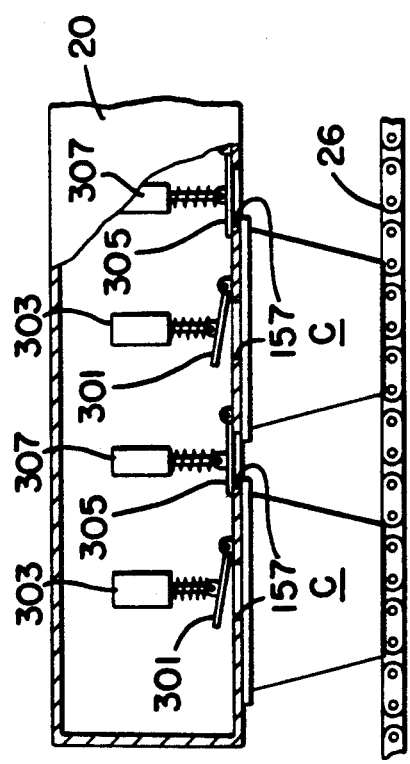

MEANS FOR HANDLING PLASTIC CONTAINERS

This invention relates to a means for handling plastic containers, and more particularly, to means for transferring such containers from a conveyor to a tray.

The packaging of foods in plastic containers is economically feasible only if the handling of these containers can be mechanized. The means conventionally employed in handling cans and jars are often not suitable for plastic containers because of their physical characteristics. The limitations imposed by such characteristics manifests itself, for example, in the loading of trays for processing in an automatic batch retort. In this example, plastic containers must be transferred from a conveyor and arranged in a predetermined pattern in a tray for subsequent loading into the retort. The speed or rate of transfer of containers to the trays is important. This rate of transfer is increased when the idle time for the transfer mechanism, i.e., the time during which the transfer mechanism must wait for containers to reach the proper position to be picked-up, is reduced. The containers should also be spaced apart from each other to achieve uniform heating on the retort. When multiple containers are transferred at once, the containers must also be properly positioned before the transfer can be effected. This proper and timely positioning of the containers is commonly referred to as "in-feed timing".

The present invention provides a means of transferring plastic containers from a conveyor to a tray which is fully automatic, which can rapidly, reliably and accurately effect such transfer, which can effect proper in-feed timing for containers to a transfer mechanism, which maintains the integrity and appearance of the container, which aids in removal of liquid that may be present on the lid of the container and/or which can arrange the containers in a tray in any number of predetermined patterns to adjust for containers and trays of various sizes.

Other attributes of the present invention and many of its attendant advantages will become more readily apparent upon a perusal of the following description and the accompanying drawings, wherein:

FIG. 1 is a pictorial representation of a transfer mechanism according to the present invention;

FIG. 2 is a schematic representation, with portions thereof broken away and eliminated, illustrating a portion of the drive system for the transfer mechanism shown in FIG. 1;

FIG. 3 is a detail view of a portion of the drive for the transfer mechanism shown in FIGS. 1 and 3;

FIG. 4 is a schematic representation, similar to FIG. 2 illustrating the drive system;

FIG. 5 is a schematic representation of one embodiment of an in-feed timing system according to the present invention;

FIG. 6 is an end view taken on line 6—6 of FIG. 5;

FIG. 7 is a view taken on line 7—7 of FIG. 5;

FIG. 8 is a schematic representation of another embodiment of an in-feed timing system according to the present invention;

FIG. 9 is a view taken on line 9—9 of FIG. 8;

FIG. 10 is a representation of another embodiment of an in-feed timing system;

FIG. 11 is a side view illustration of the lifting of a container into engagement with the transfer head;

FIG. 12 is a view taken on line 12—12 of FIG. 10;

FIG. 13 is a representation of still another embodiment of an in-feed timing system;

FIG. 14 is a representation of another embodiment of an in-feed timing system;

FIGS. 15, 16 and 16A illustrate still another embodiment of an in-feed timing system;

FIG. 17 illustrates still another embodiment of an in-feed timing system;

FIG. 18 is a view showing a vacuum release mechanism according to the present invention;

FIG. 19 is a view, partial in section, showing a container engagement arrangement according to the present invention;

FIG. 20 is a representation of another embodiment of an in-feed timing system; and FIG. 21 is sectional view of still another embodiment of an in-feed timing system.

Referring now to FIG. 1, there is shown an indexing conveyor 10 which is powered by a drive sprocket 12, which in turn is driven by a stepper motor 14 through a conventional chain and sprocket arrangement. Trays, one of which is shown at 16, accept plastic containers C from the transfer mechanism, indicated generally at 18, and are used to hold the container C during the processing. An individual tray 16 is initially placed on the indexing conveyor 10 and the stepper motor is activated to move the tray 16 to an initial position, as determined by the tray 16 engaging a releasable stop, for example, to accept a row of containers C from the transfer mechanism 18. After each row of containers C is positioned in the tray, the stepper motor 14 is actuated to index the tray 16 to accept another row of containers. A microprocessor may be used to coordinate the rotation of the stepper motor, and hence the movement of the tray 16, with the cycling of the transfer head 20 of the transfer mechanism 18 so that the rows of containers C are properly positioned adjacent each other in the tray 16. Once the tray 16 is filled, as determined by the aforementioned microprocessor counting the cycles of the head 20, for example, the stepper motor 14 is activated to convey the filled tray away from the transfer mechanism, for transport to the batch retort, and to convey an empty tray 16 to the initial position on the indexing conveyor 10.

The transfer mechanism 18 has a rectangular frame 22 supported on legs 24 to elevate the transfer head 20 above the trays 16 and a conveyor 26 which brings the containers C in single file to the transfer mechanism 18. The transfer mechanism 18 includes drives to produce motion in what may be considered to be X, Y and Z directions, as indicated by the double-headed arrows X, Y and Z, respectively, which allows the head 20 to be positioned, within the limits of travel provided, in an infinite number of positions and to trace a three-dimensional path. The head 20 is rigidly secured to an essentially vertical mast 30, which extends through complementary shaped and aligned openings in top and bottom plates 32 and 34, respectively (see FIG. 2). The plates 32 and 34 are secured to vertical bridge plates 36 and 38 which are spaced apart to clear the mast 30 and are secured to elongated carriers 40 and 42 to form a carriage, indicated generally at 44. Upper and lower rollers 46 and 48 are mounted at each end of the carrier 42 and engage the top and bottom respectively of a tubular guide rail 50. Three rollers 52, 54 and 56 are mounted at each end of the carrier 40 and are arranged to engage a tubular guide rail 60 at approximately 60, 180 and 300 degrees; at least the rollers 56 being adjustably mounted to permit assembly of the carriage 44 on the rails 50 and 60. Movement of the carriage 44 along the parallel rails 50 and 60 provides motion in the X direction for the transfer head 20.

The rails 50 and 60 are secured at their ends to carriers 62 and 64 (see FIG. 4), the carrier 62 having upper and lower rollers 66 and 68 at each end to engage a guide rail 70 extending across and secured to the frame 22. Three rollers 72, 74 and 76 are mounted at each end of the other carrier 64 and engage a guide rail 80, also spanning and secured to the frame 22, oriented parallel to rail 70. The rollers 72, 74 and 76 are equiangularly positioned with at least rollers 76 being adjustably secured to the carrier 64 to allow assembly. Movement of the carriers 62 and 64 along the rails 70 and 80 imparts motion in the Y direction to the transfer head 20. A stepper motor 82 drives a shaft 84, rotatably mounted by bearings on the frame 22, on which sprockets 86 and 88 are secured. A cogged belt 90 is trained over the sprocket 86 and a sprocket 92 rotatably mounted in bearings on the opposite side of the frame 22 with the lower run of the belt secured to each end of the carrier 64 by means of attachment blocks, one of which is shown at 94. Similarly, a cogged belt 96 is trained over the sprocket 88 and a sprocket 98 with the lower run thereof secured to each end of the carrier 62 by attachment blocks 100. Rotation of the stepper motor 82 in a clockwise direction, as viewed in FIG. 4, will cause the carriers 62 and 64 to move downward toward the left and reversing the rotation of the motor 82 will cause the carriers 62 and 64 to roll along the rails 70 and 80 toward the right. Since the carriage 44 is mounted on the rails 50 and 60, which move with the carriers 62 and 64, the head 22 will also be moved in the Y direction by rotation of the motor 82. Movement in the X direction is controlled by another stepper motor 102 which drives a shaft 104. The casing of motor 102 is supported by the carrier 62 and the shaft 104 is rotatably supported therefrom. Sprockets 106 and 108 are affixed to each end of the shaft 104. Sprockets 110 and 112 are rotatably supported by the carrier 64 and aligned with the sprockets 106 and 108 respectively. A cogged belt 114 is trained over the sprockets 106 and 110 with its lower run affixed to each end of the carrier 40 (see FIG. 2) by attachment blocks 116. Similarly, a cogged belt 118 is trained over sprockets 108 and 112 with its lower run attached by blocks 120 to the carrier 42. Movement in the Z direction is controlled by a stepper motor 122 (see FIGS. 2 and 3) which has its casing supported from the carrier 42. The motor 122 drives a cogged belt 124 positioned in the space between the vertical plates 36 and 38 and trained over upper and lower sprocket 126 and 128 respectively. These sprockets are positioned one above the other and are rotatably supported by the plates 36 and 38. A bracket 130 is secured to both the mast 30 and the adjacent or inner run of the belt 124, which run is essentially vertical and parallel to the mast 30.

The function of the head 20 is to lift the proper number of containers C from the conveyor 26, transport them to the tray 16, deposit them in the proper position in the tray, and return to lift the next set of containers. While the head 20 is returning for the next set, the tray 16 must be indexed. The transfer mechanism 18 controls the motion of the head 20 through the stepper motors 82, 102 and 122. The direction of rotation and the relative speeds of these motors to obtain the proper movement of the head 20 in three dimensions is controlled by a controller 132. As illustrated schematically in FIG. 4, the controller 132 is connected to control the motors 82, 102 and 122. Since the pattern of the rows of containers in a tray may vary, e.g., every other row offset by a small amount to enhance air flow and heat transfer in the retort, for example, and/or container size or shape may vary, the controller 132 is preferably programmable. The controller 132 is also connected to control the motor 14 driving the indexing conveyor 10, the motor 14 being activated to index the tray 16 the proper distance once the controller senses that the motor 122 has rotated sufficient for the head 20 to clear the side of the tray 16. Since the head 20 has to clear the container following the set or row of containers being picked up, which container is moving toward the head on conveyor 26, the head must also translate in the X direction to match the speed of the conveyor 26. The controller 132 must, therefore, be provided with data representing the speed of conveyor 26 such as, for example, by means of a shaft encoder 131 on the output shaft of motor 136, as well as data to indicate the position of at least the first container in the set of containers to be picked up, which is provided by, for example, a photoelectric sensor 133.

Referring to FIG. 5, the head 20 consists essentially of a hollow member which is connected to the intake of a fan or blower 150 through a flexible hose 152. The lower face 154 of the head 20 is provided with openings 156 evenly spaced along the length thereof and separated to permit a container C to be positioned under each of the openings 156. The fan or blower 150 should have the capacity to evacuate sufficient air from the head 20 to a vacuum low enough to support a single container blocking only one of the openings. When the head is lowered onto one or more containers, the lower pressure or vacuum developed inside the head by the fan 150 will permit atmospheric pressure to hold the container or containers against the head while the head is moved to the tray 16. When properly positioned, the air pressure inside the head is raised to substantially atmospheric by opening a release valve 158 covering an opening in the top of the head 20. The opening is sufficiently large to permit a rapid rise in pressure within the head 20 even though the fan 150 continues to evacuate air from the interior of the head. The increase in pressure, i.e., reduced vacuum, permits gravity to separate the containers C from the head, forming a row of containers in the tray 16, as the head is moved back to the conveyor 26 to pick up more containers.

An in-feed timing system indicated generally at 160 is necessary to assure that the containers C are spaced properly on the conveyor 26 so the containers will match or align with the openings 156 in the head 20 to permit the vacuum to hold the containers on the head. It is not necessary to provide a full complement of containers, i.e., one container for every opening, but those containers that are provided must match or align with their respective openings 156 in head 20. The desired pattern of containers on the trays may vary and may include, for example, adjacent rows with different quantities of containers. A pair of timing chains 161 and 162 with a plurality of projecting fingers 164 and 166 respectively provided on each are positioned on each side of the conveyor 26 and are driven at the same speed as the conveyor 26 so that containers will remain in proper timing and spacing on conveyor 26. The containers are positioned against the fingers 164 and 166 of the timing chains 161 and 162 by fixed pairs of air jets 168, 170 positioned on each side of the conveyor 26 and angled at about 45 degrees. The air to the jets 168, 170 is provided through a conduit 172 connected through an on-off valve 174 with a source of compressed air 176. The valve 174 is normally closed and is opened by actuation of a solenoid 178. A sensor 180, which may be of the conventional photoelectric type sensing the light from a source 181, indicates when the container has passed the jets 168, 170. A programmable logic controller or PLC 182, upon receipt of such indication from the sensor 180, sends a signal to cause the solenoid 178 to open the valve 174. The force of the air from jets 168, 170 will slide the container on the conveyor 26 into contact with the opposed fingers 164 and 166. In order for the final jets 168, 170 to function in this manner, the container must be timed, i.e., positioned on the conveyor 26 so that it reaches the final jets 168, 170 in proper relation to the position of the fingers on the timing chains. This is achieved by sensing the position of an individual container upstream of the final jets and relating that to the finger position. The position of the fingers 164 and 166, as determined by sensor 184, and the position of a container as determined by the sensor 186 are provided to the PLC 182 which will generate an error signal related to how far the container is from its proper position. If that container is not positioned where it should be, the PLC will cause a timed opening of valve 188 as a function of the error signal, i.e., the larger the signal the longer time the valve 188 is open, to direct air under pressure to the jets 190, 192 causing that container to be shifted on the conveyor 26.

A second sensor 194 will then check the shifted position of that container and generate another error signal. If it has not been sufficiently shifted, i.e., moved to the proper position relative to the finger 164, the PLC 182 will activate valve 196 for a time related to this second error signal to direct another timed air stream through jets 198, 200 to shift that container another increment. A third sensor 202 will permit the processor 182 to compare the actual position of that container relative to its ideal position, generating a third error signal. If that container is still not properly positioned, the processor 182 will cause the valve 204 to be opened for a time related to the third error signal to effect a final adjustment of that particular container. That container will then be pushed against the next opposed fingers 164 and 166 by the jets 168 and 170. By storing the different error signals the PLC 182 can detect error trends and make adjustments by increasing or decreasing the time the valves 188, 196 and 204 are open to correct for consistantly under-shooting or over-shooting the proper position for containers. Guide rails 206 and 208 are preferably provided on either side of the conveyor 26 so that containers remain centered on the conveyor.

While the embodiment shown in FIGS. 5–7 employs fingers 164 and 166 to mechanically assure the position of the container, such fingers are not always necessary. The in-feed timing of the containers may be achieved by the air jets alone if the PLC 182 with information representing the proper positions for containers. In such cases, the fingers 164 and 166 and the belts to which they are attached are not available to provide necessary in-feed timing information and a substitute therefor must be provided. An absolute shaft encoder on the drive shaft of conveyor 26, for example, could be used to indicate the proper position for theoretical containers, or a star wheel moved by containers as they pass by on the conveyor 26 could be used to indicate the position of actual containers on the conveyor 26.

Referring to the timing system shown in FIGS. 8 and 9, the set of containers is not picked up on the fly, i.e., engaged by the head 20 while they are moving with the conveyor 26, as the set of containers is in the in-feed timing system shown in FIGS. 5–7. Instead, each container of the set is arrested at the proper position and the head 20 picks up the set while stationary with containers sliding on the conveyor 26. The first container C1 of a set or row of containers actuates a sensor 210 when properly positioned which causes a processor 212 to activate a gate or stop 214 which arrests movement of that container. The second container C2 when properly positioned actuates a sensor 216 causing processor to raise a gate 218. Similarly, a gate 220 is elevated to arrest container C3 when properly positioned as determined by sensor 222. Additional sensors and gates are provided, as needed to assemble a predetermined set of containers with the desired spacing. When the cycle time has elapsed to accumulate the desired number of containers, head 20 is lowered, picks up the stopped containers and moves to deposit them in the tray 16.

The in-feed timing system shown in FIGS. 10–12 utilizes a plurality of elevating means to lift the containers into engagement with the openings 156 in the head 20. Each elevating means, indicating generally at 250, is positioned under one of the openings 156 and includes a pair of arms 252 and 254 positioned on each side of the conveyor 26 and secured to a rod 256. The rod 256 is rotatably mounted on a support member 258 and an actuating lever 260 is attached at one end thereof. A solenoid 262 is pivotally attached to the support member 258 and has a reciprocable rod 264 pivotally attached to the lever 260. Energizing the coil of solenoid 262 causes the rod 264 to be retracted rotating the rod 256 and elevating the outer ends of the arms 252 and 254. The container C positioned over the arms 252 and 254 is thereby elevated into contact with the corresponding opening 156. A seal 266 encircling each opening 156 and secured to the lower surface of the head 20 enhances the holding power of the vacuum. The arms 252 and 254 are positively lowered, when the solenoid is deenergized, by a compression spring 268 trapped on the rod 264 between the solenoid 262 and the lever 260. Each solenoid is energized when a container is properly positioned by a sensor 270. Again, when the cycle time has elapsed for the head 20 to accumulate the desired number of containers, the head 20 moves to deposit them in the tray 16.

The in-feed timing system illustrated in FIG. 13 is similar to that shown in FIG. 5 in that the containers are picked up by the head 20 on the fly. The containers C must, therefore, be properly positioned on the conveyor 26. A first pair of drive belts 280 and 282 are positioned on each side of the conveyor 26 and engage the sides of the containers C. The belts 280 and 282 are each driven by a variable speed motor 284. The motors 284 are operated at the same speed and their speeds are controlled by a microprocessor, not shown, which increases the speed of the motors 284, so that the belts 280 and 282 move at a speed faster than the conveyor if a sensor 286 indicates that an individual container is not properly positioned on the conveyor 26. A second sensor 288 then checks the position of that container. If it has not been sufficiently repositioned, as indicated by the sensor 288, a second set of similar belts 290 and 292 driven by variable speed motors 294 will make a final adjustment of that container on the conveyor 26. The length of the belts in each set is about equal to the pitch P, which is the desired distance between the centers of adjacent containers. When the desired number of containers reach a predetermined position, the head 20 is lowered on the fly to permit the vacuum in the head to pick up those containers for transfer to and deposit in the tray 16.

The in-feed timing system illustrated in FIG. 14 utilizes the vacuum within the head 20 to effect a pick-up of each container. A valve 300 is pivotally mounted over and is capable of covering, but not completely sealing, each of the openings 156 in the head 20. A solenoid 302 is pivotally attached to the interior of the head 20 and has a reciprocable rod 304 pivotally attached to the valve 300. A compression spring 306 trapped over the rod 304 assures the valve 300 is closed when the solenoid 302 is deenergized. The valve 300 is opened when the solenoid 302 is energized, which occurs at the proper time as a response to a sensor 308. The head 20 must be spaced only a small distance from the top of the containers so the vacuum will be able to lift the containers into engagement with the head. The containers are picked up in sequence, with the first one picked up being at the downstream end of the head 20. When the desired number of containers have been picked up by the head 20, they are transferred to the tray 16. The release of the containers into the tray 16 is effected by all of the solenoids 302 being simultaneously deenergized. The valves 300 are closed by the springs 306 when the head 20 is properly positioned over the tray 16.

The in-feed timing system illustrated in FIG. 20 is similar to that shown in FIG. 14. The openings 157 are separated a distance which is less than one-half the width of the container lid. Alternate openings 157 are provided with valves 301 and 305, similar to valves 300, which are respectively actuated by solenoids 303 and 307. The containers are picked up in sequence, as with the embodiment shown in FIG. 14, but using only the valves 301 or only the valves 305 for assembling the desired number of containers to form a row in the tray 16. Selective use of the valves 301 and 305 permits formation of adjacent rows with containers in each row offset from the containers in the adjacent row by one-half of a container width.

The in-feed timing system illustrated in FIG. 21 is similar to those shown in FIGS. 14 and 20. The openings 157 in the head 20 are spaced apart as in the embodiment of FIG. 20. A plate 310 having openings 312 is shiftable between two positions by means of a solenoid 314. The openings 312 are spaced apart twice as far as the openings 157 so that the openings 312 are alignable with alternate ones of the openings 157. The containers C can thus be arranged in a tray with containers in adjacent rows offset by half the width of a container. This is achieved by simply shifting the plate 310 between its two positions. The number of containers in adjacent rows in the tray can also be varied by the number of holes 157 in the head equal to twice the number of holes 312 plus one. In one position of the plate 310, the only holes 157 in communication with the lower pressure within the head 20 are those which align with the holes 312 in the plate. In this case the number of containers that can be picked up is equal to the number of holes 312 in the plate 310. Both the plate 310 in its other position, the additional holes 157 in the head 20 is also uncovered in addition to those holes 157 which are aligned with the holes 312 in the head 20. Thus, the number of containers that can be picked up is one more than the number of holes in the plate 310.

The in-feed timing system of FIGS. 15 and 16 is also an on-the-fly pick-up system. The conveyor 310, in this section at least, is a series of parallel rollers 312 which are driven at a constant rotational speed, i.e., at the same number of revolutions per unit time. The rollers 314 have a circular protrusion 316 of greater diameter and are positioned apart one pitch, where the pitch is the desired distance between the centers of adjacent containers. As shown in FIG. 16A, the radius r of the rollers 314 is ideally equal to the pitch divided by 6.28, while the arc length L of the protrusion 316 is no longer than the spacing between the bottoms of adjacent containers. That spacing depends, in part, on the taper of the sides of the containers and the pitch. The arc length L is a geometric function of the radius R and the angle A. The rollers 314, while having the same rotational speed as the rollers 312 have a greater peripheral velocity for that circumferential portion of the protrusion 316 because the radius of the protrusion 316 is greater. The protrusions 316 are synchronized and by being spaced one pitch apart, will not contact the bottom of the containers if they are properly positioned. However, if the containers are out of time, the protrusions 316 will contact the bottom of the container, such as shown in FIG. 16 with container C4. The higher peripheral speed to the protrusion will accelerate the container C4. By providing more than one roller 314 spaced at one pitch intervals, an out of time container can be properly positioned for pick-up of the set of containers by the head 20 on the fly.

The in-feed timing system illustrated in FIG. 17 is similar to that of FIGS. 15 and 16 except that acceleration of the out-of-time container is achieved by engagement with a set of rollers operated at higher rotational speeds than the other rollers. In this embodiment, a set of rollers 320 are positioned on a frame 322 with a space of one pitch therebetween and are driven at higher rotational speeds than the rollers 324 positioned between the rollers 320. All rollers have the same diameter. The frame 322 is raised and lowered at a frequency equal to the rate of travel of the container, i.e., if the containers are conveyed by the rollers 324 at the rate of 200 per minute, the frame 322 must be raised and lowered at the rate of 200 times per minute. If the containers are properly timed, the higher speed rollers 320 will come up between the containers without making contact therewith. However, if a container is out of time, the higher speed rollers 320 will contact that container accelerating it to achieve proper timing. A convenient means of raising and lowering the frame 322 is by means of a solenoid 326 with a reciprocable rod 328 having a compression spring 330 to assure lowering of the frame 322. While gravity will assist such lowering, at high rates the decay of the magnetic field created by the coil of the solenoid may not be fast enough to permit the rollers 320 to return to the level of the other rollers 324. The force of spring 330 will overcome the problems created by decay of the magnetic field in the coil. The energization of the solenoid at the desired rate may be achieved by any suitable means, but an electronic switch means is preferred for such high rates.

FIG. 18 illustrates a suitable valve for permitting the pressure in the head 20 to allow release of the containers in the tray 16. The pressure inside the head 20 must be raised, i.e., the vacuum reduced, very quickly to allow the head to return for the next containers. A valve plate 400 shaped to block an opening in the top of the head 20 is attached at its midpoint to a rod 402 which extends through and is rotatably mounted in a flange 404 surrounding the opening. A lever 406 is attached to the free end of the rod 402. A solenoid 408 having a reciprocable rod 410 is pivotally attached to the lever 406 and when energized rotates the valve plate 400 to permit air pressure inside and outside of the head 20 to equalize. Rotating the valve plate 400 about its midpoint results in a rapid increase in area available for ambient air to enter the head 20 which minimizes the time required to increase the pressure inside the head. A compression spring 412 trapped on the rod 410 closes the valve plate 400 when the solenoid 408 is deenergized. When the valve plate 400 is closed the vacuum inside the head 20 is high, i.e., the pressure is low, and when opened air is permitted to freely flow into the head raising the pressure substantially to atmospheric. The solenoid 408 may be controlled by the processor 132. The time required to increase head pressure or reduce head vacuum can be further reduced, where necessary, by restricting a rigid portion 418 of the hose 152 through which air is evacuated from the head 20. A damper plate 420 is attached at its midpoint to a rod 422 extending through the tube 152 to rotatably mount the plate 420 therein. A lever 424 is attached to a protruding end of the rod 422 and a solenoid 426 is pivotally attached to the lever 424. The plate 420 is pivoted by the solenoid to restrict the portion 418 when the valve plate 400 is opened. The simultaneous energizing of the solenoids 408 and 426 may also be controlled by the microprocessor 132. A compression spring 428 between the lever and the solenoid body returns the damper plate 420 to a position offering least resistance to air flow when the solenoid 426 is deenergized.

The lids on plastic containers are not as rigid as those on other types of containers and can be unacceptably wrinkled or damaged by high or even medium vacuum. FIG. 19 illustrates a means for assuring such lids are not harmed. A plate 420 is secured to the bottom of the head 20 and has openings 422 aligned with those therein. A plurality of protruding dimples 424 are arranged around the opening 422. The dimples 424 extend below the lower plane of the plate 420 and preferably do not exceed more than 3/16 of an inch. The flow of air between the plate 420 and the top of the container lid created by the fan 150 will cause a pressure lower than atmospheric in the space created by the dimples 424. The net forces of air pressure acting on the container will hold the container against the plate 420. The plate 420 may be changed to provide smaller sized dimples and hence less clearance. The higher vacuum achieved with less clearance accommodates containers of greater weight. The flow of air over the top of the lid also functions to remove liquid, such as water, that may be on top of the lid.

While various forms of the invention has been shown and described herein, it will be appreciated that still other changes and modifications may be made therein without departing from the spirit of the invention as defined by the scope of the appended claims.

What is claimed is:

1. A transfer mechanism for transferring plastic containers from a continuously moving transport conveyor to a tray comprising:

a head having a lower surface with at least one opening therein;

drive means supporting said head to move the same in a predetermined pattern, which pattern includes first moving said head adjacent said containers while simultaneously moving said head to match the movement of said conveyor and then moving said head over said tray;

means connected to evacuate air from said head while said head is adjacent said containers; and means for substantially equalizing the pressure inside and outside of said head when said head is over said tray.

2. The invention according to claim 1, and further comprising:

an indexing conveyor supporting said tray; and means for moving the tray a predetermined amount to permit said head to form adjacent rows of containers.

3. The invention according to claim 1, and further comprising in-feed timing means to assure containers are coordinated with the movement of said head.

4. The invention according to claim 3, wherein said in-feed timing means comprises:

timing means for engaging said containers on said transport conveyor;

first sensor means for determining the position of said timing means;

second sensor means for determining the position of a container on said transport conveyor; and first jet means for directing compressed gas against said container to urge the same against said timing means.

5. The invention according to claim 4 and further comprising:

third sensor means for determining the actual position of a container;

comparator means for determining the proper position of said container; and second jet means for adjusting the position of said container on said transport conveyor.

6. The invention according to claim 3, wherein said in-feed timing means comprises a plurality of jet means for directing compressed gas toward a container;

sensor means associated with each of said jet means;

comparator means for actuating each of said plurality of jet means as required to coordinate the position of each container with the movement of said head.

7. The invention according to claim 3, wherein said in-feed timing means comprises:

a stop movable between an extended position to arrest a container on said transport conveyor and a retracted position which permits containers to move with said transport conveyor; and actuating means for moving said stop to its extended position whereby a container is arrested in the proper position to be picked up by said head.

8. The invention according to claim 3, wherein said in-feed timing means comprises:

elevating means movable between a retracted position and an elevated position in which a container is lifted into close proximity to said opening in said head; and actuating means for moving said elevating means to its elevated position in response to a container being positioned under said at least one opening.

9. The invention according to claim 3, wherein said in-feed timing means comprises:

a pair of belts, one positioned on each side of said transport conveyor and frictionally engaging containers passing on said transport conveyor;

variable speed motors for driving said belts;

means for sensing the position of a container on said transport conveyor and increasing the speed of said motors as required to coordinate the position of said container on said transport conveyor with the movement of said head.

10. The invention according to claim 3, wherein said in-feed timing means comprises:

a valve plate on said head movable between a closed position covering said at least one opening in said head and an open position remote therefrom; and actuating means for moving said valve plate to said open position in response to a container being positioned beneath said opening.

11. The invention according to claim 3, wherein said in-feed timing means comprises:

first drive roller means for conveying containers at a desired rate;

second drive roller means for conveying containers at a rate higher than said desired rate; and reciprocating means for vertically cycling said second drive roller means at a rate equal to said desired rate.

12. The invention according to claim 1, wherein said pressure equalizing means comprises:

an opening in said head;

a valve to cover and uncover said opening; and actuating means responsive to positioning of said head over said tray to uncover said opening.

13. The invention according to claim 12 wherein said pressure equalizing means further comprises:

damper means pivotally mounted to either restrict or permit the evacuation of air from said head;

said damper means normally positioned to permit said evacuation; and means to pivot said damper means to restrict said evacuation when said head is over said tray.

14. The invention according to claim 1, and further comprising means for spacing the top of said container from the lower surface of said head whereby distortion of said top is minimized.

15. A transfer mechanism for transferring a plurality of plastic containers from a continuously moving transport conveyor to a tray comprising:

a head having a lower surface with a plurality of openings therein;

drive means supporting said head to move the same in a predetermined pattern, which pattern includes first moving said head adjacent said containers while simultaneously moving said head to match the movement of said conveyor and then moving said head over said tray;

means connected to evacuate air from said head while said head is adjacent said containers; and responsive to said head being over said tray for substantially equalizing the pressure inside and outside of said head.

16. The invention according to claim 15, and further comprising:

means for moving said tray a predetermined amount each time said head is cycled to permit the formation of adjacent rows of containers in said tray.

17. The invention according to claim 16, and further comprising in-feed timing means to assure containers are positioned on the transport conveyor so as to be coordinated with movement of said head and to permit the desired number of said plurality of openings to be covered by a container.

18. The invention according to claim 17, wherein said in-feed timing means comprises:

a plurality of stops, each of which is individually movable between an extended position to arrest a container on said transport conveyor and a retracted position which permits containers to move with said transport conveyor; and actuating means for sequentially moving said stops to extended positions whereby a single container is arrested by each of said plurality of stops.

19. The invention according to claim 17, wherein the distance between centers of adjacent openings in said head is substantially constant and is defined as one pitch and wherein said in-feed timing means comprises:

a first pair of belts, one positioned on each side of the transport conveyor;

variable speed motors for driving said belts; and means for sensing the position of an individual container and increasing the speed of said motors to reposition said individual container when the distance between the center of said individual container and the center of the container preceding said individual container is greater than one pitch.

20. The invention according to claim 17, wherein said in-feed timing means comprises:

a plurality of valve plates on said head, each of which is associated with one of said plurality of openings;

said valve plates being individually movable between a closed position covering the associated opening and an open position providing relatively free air flow through said associated opening; and actuating means for individually moving said valve plates to said open position to permit containers to be sequentially attached by vacuum to said head.

21. The invention according to claim 17, wherein the distance between the centers of adjacent openings in said head is substantially constant and is defined as one pitch and wherein said in-feed timing means comprises:

a plurality of drive rollers for conveying said containers;

means for driving said drive rollers at the same rotational speed;

all of said drive rollers having the same diameters;

a plurality of accelerating rollers positioned a distance of one pitch apart;

said accelerating rollers being of the same diameter as said drive rollers except for a large diameter protrusion thereon;

said accelerating rollers being synchronized and driven at the same rotational speed as said drive rollers whereby containers will contact said protrusion and be accelerated when the spacing therebetween is greater than one pitch.

22. The invention according to claim 17, wherein the distance between the centers of adjacent openings is substantially constant and is defined as one pitch and wherein said in-feed timing means comprises;

a plurality of drive rollers;

means for driving said drive rollers at a desired rate;

a vertically reciprocable frame;

accelerating rollers mounted on said frame at one pitch intervals and driven at a rate greater than said desired rate; and reciprocating means for cycling said frame at a rate substantially equal to said desired rate.

23. An in-feed timing means for containers supplied on a conveyor which requires a predetermined spacing for said containers, which is compatible with a pick-up head, said timing means comprising:
- jet means for directing compressed gas toward a container;
- sensor means associated with said jet means;
- comparator means for actuating said jet means as required to coordinate the position of each container with the movement of said head.

24. An in-feed timing means for containers supplied on a conveyor which requires a predetermined spacing for said container; said timing means comprising:
- timing means for engaging said containers on said transport conveyor;
- first sensor means for determining the position of said timing means;
- second sensor means for determining the position of a container on said transport conveyor; and
- first jet means for directing compressed gas against said container to urge the same against said timing means.

25. The invention according to claim 24 and further comprising:
- third sensor means for determining the actual position of a particular container;
- comparator means for determining the proper position of said particular container;
- second jet means for directing compressed gas against said particular container as required to correct for differences between the actual and proper positions for said particular container.

26. A vacuum head for effecting transfer of container comprising:
- a hollow elongate member;
- a pressure-equalizing opening in said member;
- a valve mounted to cover and uncover said opening; and
- means to selectively move said valve to permit a container to be picked up when said opening is covered and to release a container when said opening is uncovered.

27. The invention according to claim 26 and further comprising:
- a damper mounted to obstruct and allow vacuum to be applied to said member; and
- means to move said damper to allow vacuum when said valve is positioned to cover said opening and to obstruct said vacuum when said valve is positioned to uncover said opening.

28. An in-feed timing means for proper positioning of containers on a conveyor, comprising:
- a first pair of belts, one positioned on each side of said conveyor;
- variable speed motors for driving said belts; and
- means for sensing the actual position of an individual container and changing the speed of said motors to reposition said individual container when the actual position of a container varies from its proper position.

29. An in-feed timing means for positioning of containers on a conveyor to permit pick-up by a transfer head having a plurality of openings, comprising:
- a plurality of valve plates on said head, each of which is associated with one of said plurality of openings;
- said valve plates being individually movable between a release position covering the associated opening and a hold position providing relatively free air flow through the associated opening; and
- actuating means for sequentially moving said valve plates to hold positions.

30. An in-feed timing means for coordinating the position of containers, which containers have a desired pitch spacing; said in-feed means comprising:
- a plurality of drive rollers having the same diameter for conveying said containers;
- means for driving said drive rollers at the same rotational speed;
- a plurality of accelerating rollers spaced apart a distance substantially equal to said pitch spacing;
- said accelerating rollers being of the same diameter as said drive rollers except for a larger diameter protrusion thereon;
- said accelerating rollers being synchronized with and driven at the same rotational speed as said drive rollers whereby containers will contact said accelerating rollers and be accelerated when the spacing between adjacent containers is greater than said pitch spacing.

31. An in-feed timing means for positioning of containers having predetermining spacing requirements, comprising:
- a plurality of drive rollers;
- first drive means for driving said drive rollers at a desired rate;
- a vertically reciprocable frame;
- accelerating rollers mounted on said frame and spaced substantially the same as said spacing requirement;
- second drive means for driving said accelerating rollers at a rate faster than said desired rate; and
- reciprocating means for cycling said frame vertically at a rate equal to said desired rate.

32. A device for transferring a container having a lid comprising:
- a vacuum source; and
- pick-up means connected to said source and engageable with said lid to allow air flow over the top of said lid and thereby create a lower pressure over said lid sufficient to permit said pick-up means to lift said container.

33. A device for handling a container having a lid comprising:
- a vacuum source;
- pick-up means connected to said source; and
- contact means engageable with said lid to distribute low pressure over substantially the entire area of said lid;
- whereby the pressure over said lid is reduced sufficiently to permit said container to be lifted.

34. A vacuum head for effecting transfer of containers comprising:
- a hollow elongate member;
- at least one opening in the lower surface of said member; and
- a plate secured to said lower surface;
- said plate having protrusions thereon to space the top of a container from said plate.

* * * * *